(12) United States Patent
Luo

(10) Patent No.: US 12,116,031 B2
(45) Date of Patent: Oct. 15, 2024

(54) FOLDING AND MAN-RIDING STRUCTURE OF FOLDABLE CART STEERING SYSTEM

(71) Applicant: Shenzhen Chepinyi Technology Co., Ltd., Guangdong (CN)

(72) Inventor: Haicheng Luo, Guangdong (CN)

(73) Assignee: Shenzhen Chepinyi Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/593,976

(22) Filed: Mar. 3, 2024

(65) Prior Publication Data

US 2024/0300558 A1 Sep. 12, 2024

Related U.S. Application Data

(63) Continuation of application No. PCT/CN2024/078680, filed on Feb. 27, 2024.

(30) Foreign Application Priority Data

| Mar. 6, 2023 | (CN) | 202320389881.5 |
| Nov. 28, 2023 | (CN) | 202323230532.8 |
| Dec. 19, 2023 | (CN) | 202323480439.2 |
| Jan. 11, 2024 | (CN) | 202420076798.7 |

(51) Int. Cl.
*B62B 3/00* (2006.01)
*B62B 3/02* (2006.01)

(52) U.S. Cl.
CPC .............. *B62B 3/001* (2013.01); *B62B 3/022* (2013.01)

(58) Field of Classification Search
CPC ......... B62B 3/001; B62B 3/022; B62B 3/025; B62B 3/027
See application file for complete search history.

(56) References Cited

U.S. PATENT DOCUMENTS

| 6,953,203 B2 * | 10/2005 | Wilcox | B62K 15/006 280/282 |
| 9,394,027 B2 * | 7/2016 | Serpa | B62K 5/06 |
| 11,590,994 B2 * | 2/2023 | DeBry | B62B 3/002 |

\* cited by examiner

*Primary Examiner* — Bryan A Evans

(57) ABSTRACT

Disclosed is a folding and man-riding structure of a foldable cart steering system. The folding and man-riding structure includes a foldable frame, a connection device is fixedly connected to a lower end of one side of the foldable frame, the connection device includes a frame supporting seat, steering wheels are connected to a bottom of the frame, the steering wheels are connected to a steering structure by means of wheel steering swing arms, the steering structure is foldable, the steering structure is further connected to a steering rod assembly, and the steering rod assembly is configured to control movement of the steering structure. By using the above design, the steering structure composed of a plurality of steering arms is arranged between two steering wheels, and the steering structure controls steering of the steering wheels.

13 Claims, 7 Drawing Sheets

FOLDING AND MAN-RIDING STRUCTURE OF FOLDABLE CART STEERING SYSTEM

CROSS REFERENCE TO RELATED APPLICATIONS

The present application is a Continuation Application of PCT Application No. PCT/CN2024/078680 filed on Feb. 27, 2024, which claims the benefit of Chinese Patent Application No. 202320389881.5 filed on Mar. 6, 2023. The present application also claims the benefit of Chinese Patent Application Nos. 202420076798.7 filed on Jan. 11, 2024, 202323480439.2 filed on Dec. 19, 2023 and 202323230532.8 filed on Nov. 28, 2023. All the above are hereby incorporated by reference in their entirety.

TECHNICAL FIELD

The present disclosure relates to the technical field of carts, and particularly relates to a folding and man-riding structure of a foldable cart steering system.

BACKGROUND

As a foldable and towable carrier, a foldable cart is applied within a large range when carrying objects due to its simple use, carrying ability, convenient storage, and time-saving and labor-saving effects. The foldable cart is often used for outdoor activities or short-distance transportation.

At present, inclined-fork universal wheels are generally used for existing foldable or unfoldable carts to facilitate steering. On account of a structural design (in which a wheel axis and a rotation axis are located not on the same vertical line), the inclined-fork universal wheel is more convenient and labor-saving than a traditional straight-fork universal wheel (of which a wheel axis and a rotation axis are located on the same vertical line) in terms of steering. The inclined-fork universal wheel can rotate in a direction of force transmission, but is more difficult to control than the straight-fork universal wheel because its free steering. Especially under the conditions of a load and an inclined upslope road surface, the inclined-fork universal wheel rotates in a direction of a sliding force under the influence of the sliding force. In order to prevent a direction of the cart from being out of control, the cart can be pulled only by manpower in an opposite direction, which causes inconvenient use. Moreover, the cart is generally used outdoors. With free movement characteristics, the inclined-fork universal wheel performs steering automatically when pressed by a rugged road surface. Although the inclined-fork universal wheel can be straightened by increasing a forward force, the inclined-fork universal wheel is in an inclined swing state due to pressing. Furthermore, resistance of the rugged road surface exists, so an applied force is required to be greater than various types of resistance. This situation is more severe in a case of a heavy load, which greatly affects use experience of the cart.

Accordingly, there is a need to design a folding and man-riding structure of a foldable cart steering system to overcome one or more deficiencies in the prior art mentioned above.

SUMMARY

In order to solve the above technical problem, the technical solution employed by the present disclosure is as follows: a folding and man-riding structure of a foldable cart steering system includes a foldable frame. The foldable frame is a converged type frame. Steering wheels are connected to a bottom of the foldable frame, and the steering wheels are connected to a steering structure by means of wheel steering swing arms. The steering structure is foldable. A steering rod assembly is further connected to the steering structure, and the steering rod assembly is configured to control movement of the steering structure.

In a preferred example, a connection device is connected to one side of the foldable frame. The connection device includes a frame supporting seat, and the steering wheels are connected to the frame supporting seat. One end of the steering rod assembly is connected to the frame supporting seat.

In a preferred example, the steering structure includes a steering guide rod and steering arms. Several steering arms are arranged, and the several steering arms are rotatably connected end to end in sequence. Steering arms located at two ends are rotatably connected to corresponding wheel steering swing arms. One end of the steering guide rod is movably connected to the steering arm located at a middle, and the other end of the steering guide rod is connected to the steering rod assembly.

In a preferred example, a distance between the two wheel steering swing arms at a same end is less than or greater than a distance between horizontal rotation axes of the two steering wheels at a same end.

In a preferred example, the steering rod assembly includes steering rod supporting arms and a steering rod. At least two steering rod supporting arms are arranged. The steering rod is located between the two steering rod supporting arms, and a bottom of the steering rod is rotatably connected to the steering rod supporting arms. One end of each steering rod supporting arm adjacent to the steering rod is rotatably connected to the steering rod by means of a steering bearing, and one end of each steering rod supporting arm away from the steering rod is rotatably connected to the foldable frame.

In a preferred example, a seat plate is connected to an upper end of the foldable frame by means of a seat plate supporting frame, and the seat plate is detachably arranged on the foldable frame.

In a preferred example, the steering rod is connected to the steering bearing. A folding structure is further arranged on the steering rod, and the folding structure is configured to bend the steering rod in a predetermined direction. A pull rod switch sleeve is further slidably arranged on the steering rod, and the pull rod switch sleeve is configured to limit folding of the steering rod.

In a preferred example, a pedal is further rotatably connected to one end of the foldable frame provided with the steering rod assembly.

In a preferred example, two ends of the steering arm located in the middle are horizontally rotatably arranged around a center.

In a preferred example, a limiting structure configured to limit a maximum rotation angle of the steering wheel is arranged at one end of the foldable frame connected to the steering wheel.

In a preferred example, the two steering wheels connected to the steering structure are respectively provided with wheel rotation limiting structures cooperating with each other, and the wheel rotation limiting structures are configured to limit rotation of the steering wheels after the foldable frame is folded.

In a preferred example, the wheel rotation limiting structure includes a pin sleeve and a pin. The pin sleeve is arranged on one steering wheel, the pin is arranged on the other steering wheel, and the pin sleeve is opposite the pin.

In a preferred example, one end of the pin sleeve is flared.

Beneficial effects of the present disclosure are as follows: the steering structure composed of a plurality of steering arms is arranged between two steering wheels, and the steering structure controls steering of the steering wheels. Moreover, the steering structure can be switched between an unfolded state and a folded state so as to adapt to folding of the foldable frame, such that control is simple, convenient and practical. By using the structure, the steering wheels can be replaced with straight-fork universal wheels, such that running stability of a vehicle is improved, use safety is high, steering is simpler, a design is reasonable, a structure is simple, and cost is low.

Figure 1:
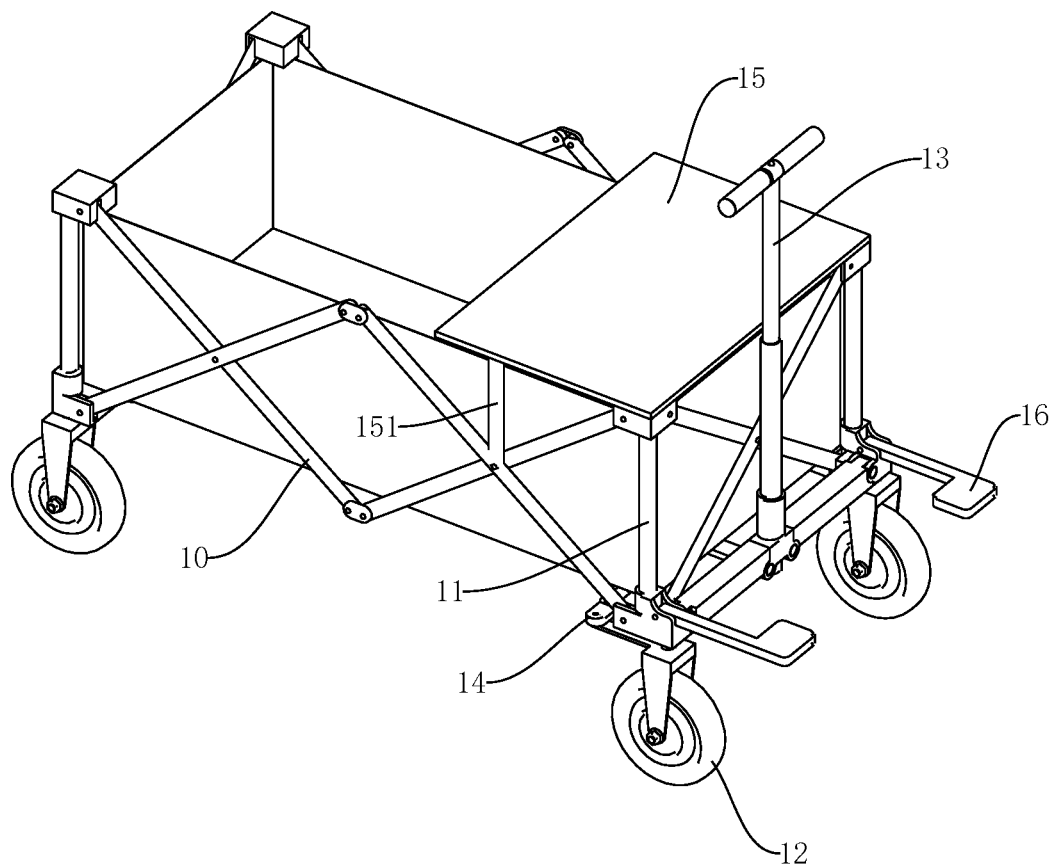
FIG. 1 is a schematic structural diagram of the present disclosure.
Figure 2:
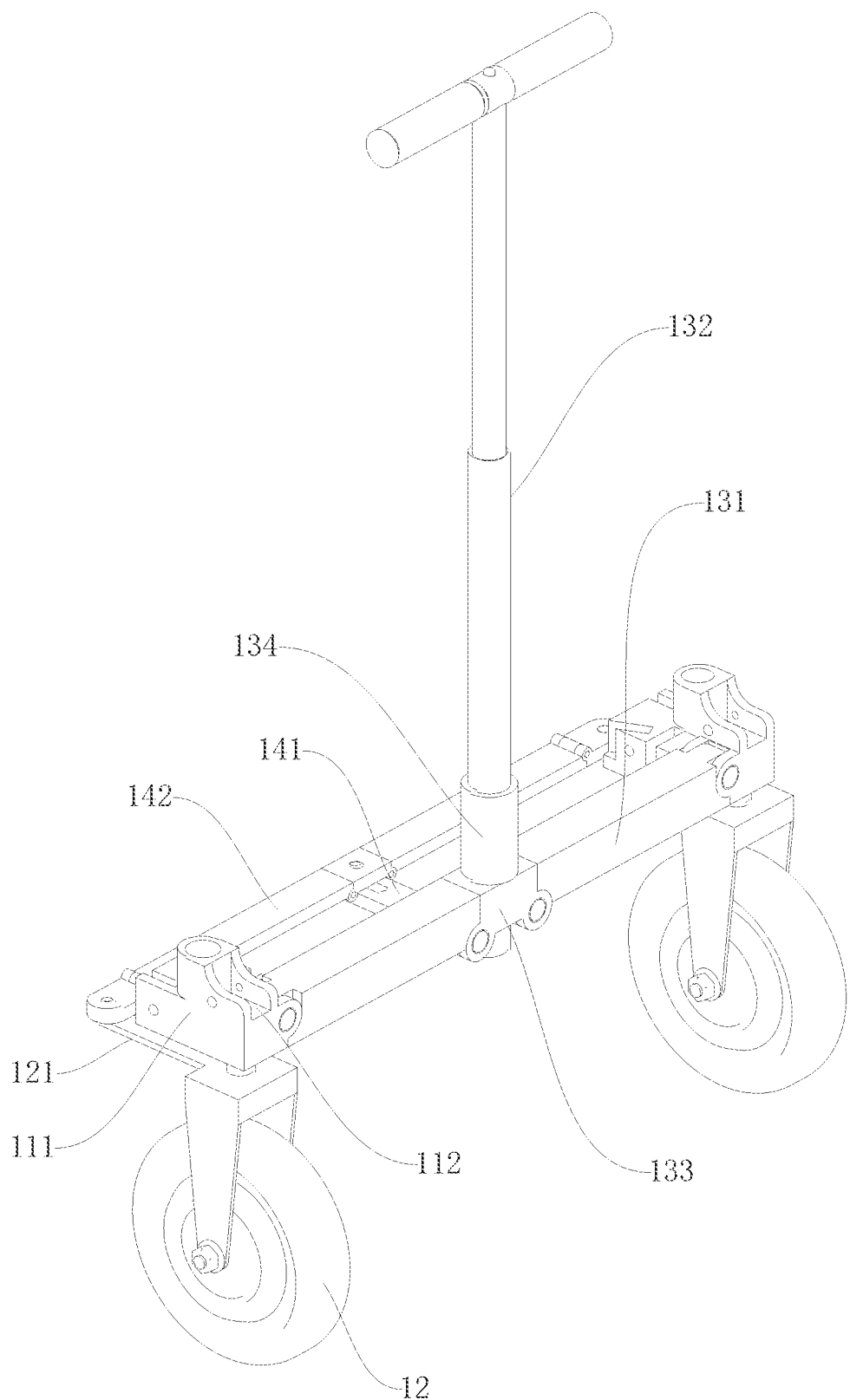
FIG. 2 is a schematic structural diagram of a steering structure and a steering rod assembly in the present disclosure.
Figure 3:
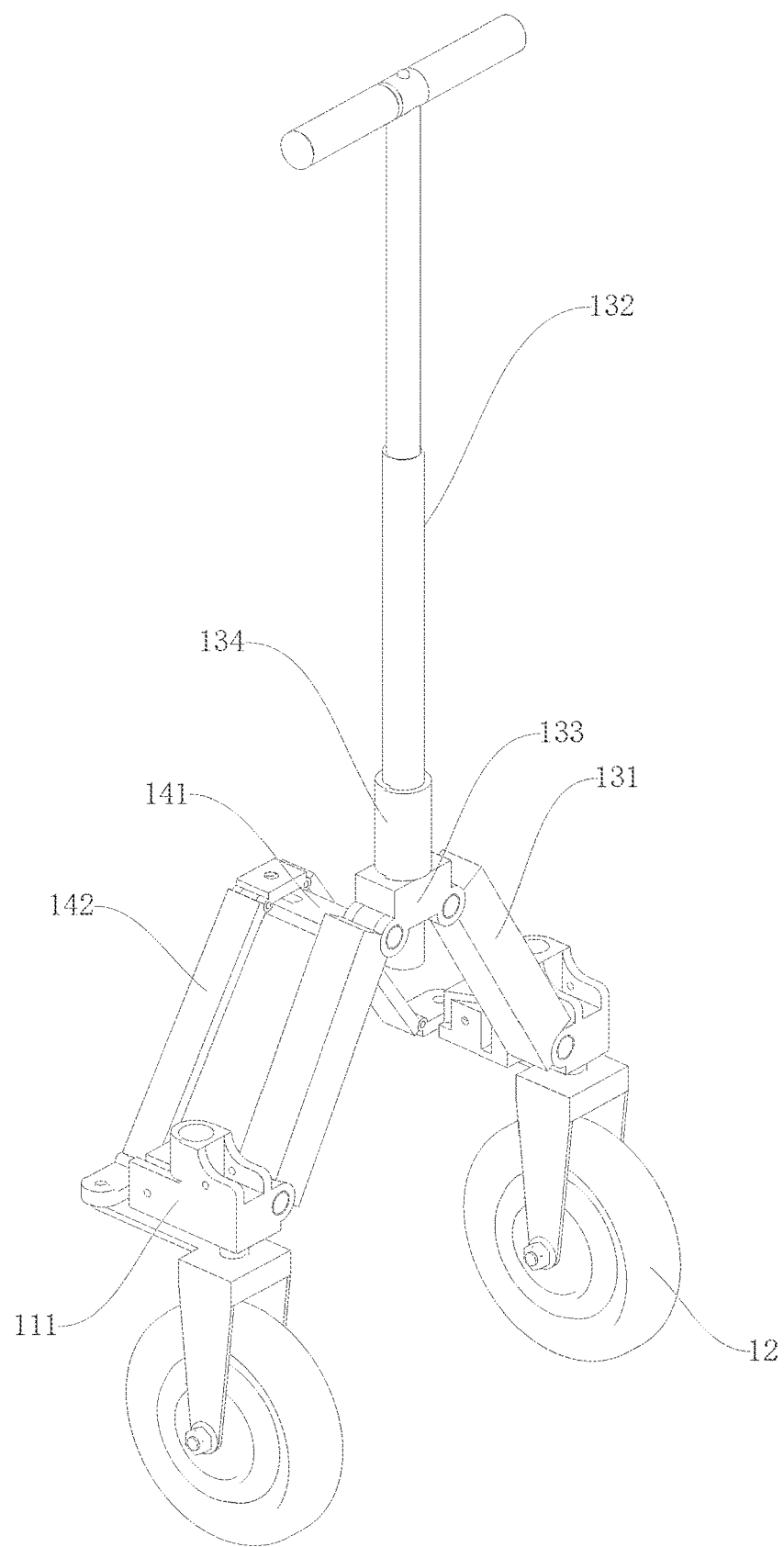
FIG. 3 is a schematic diagram of a folded state of FIG. 2.
Figure 4:
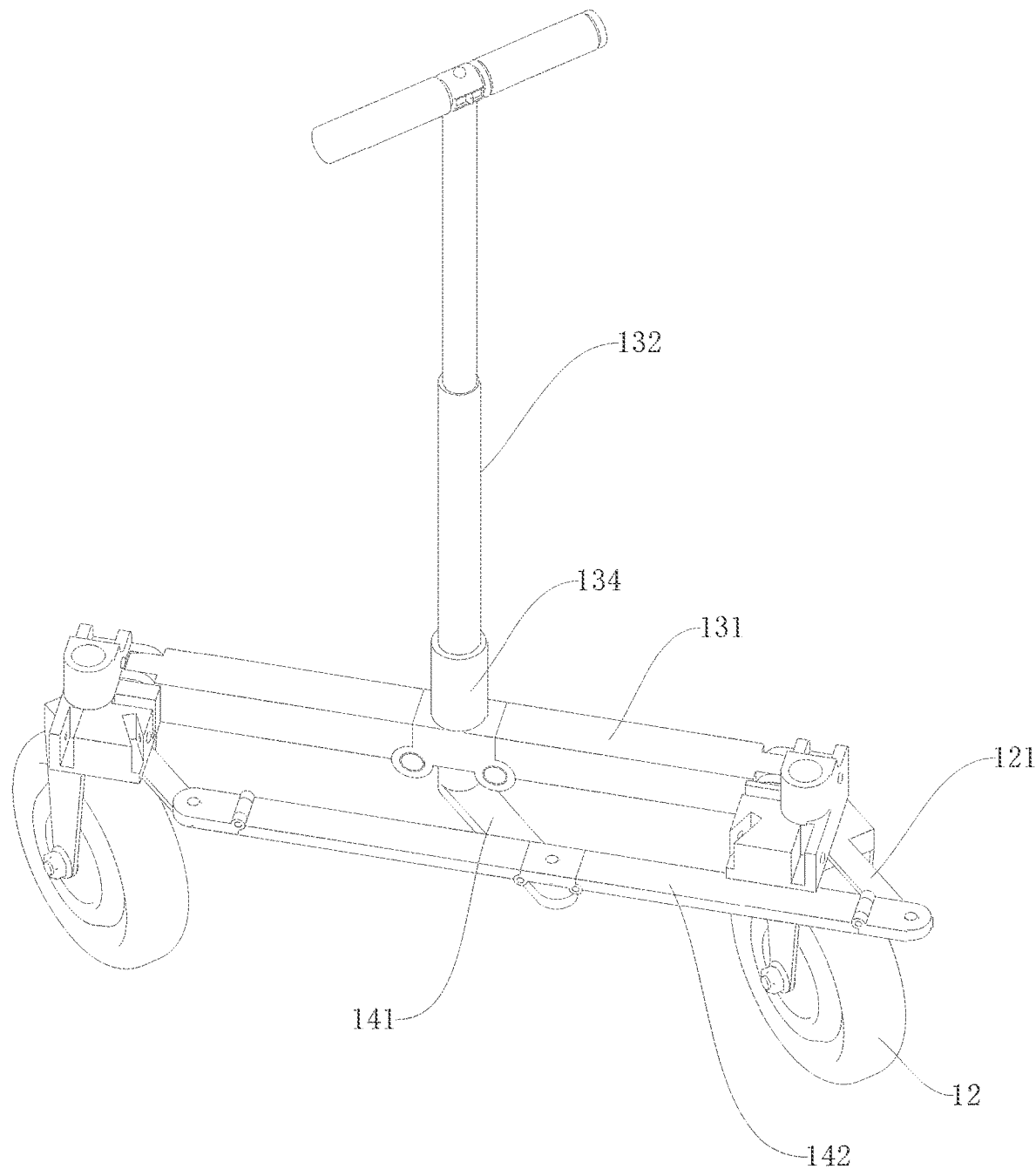
FIG. 4 is a schematic diagram of a steering state of FIG. 2.
Figure 5:
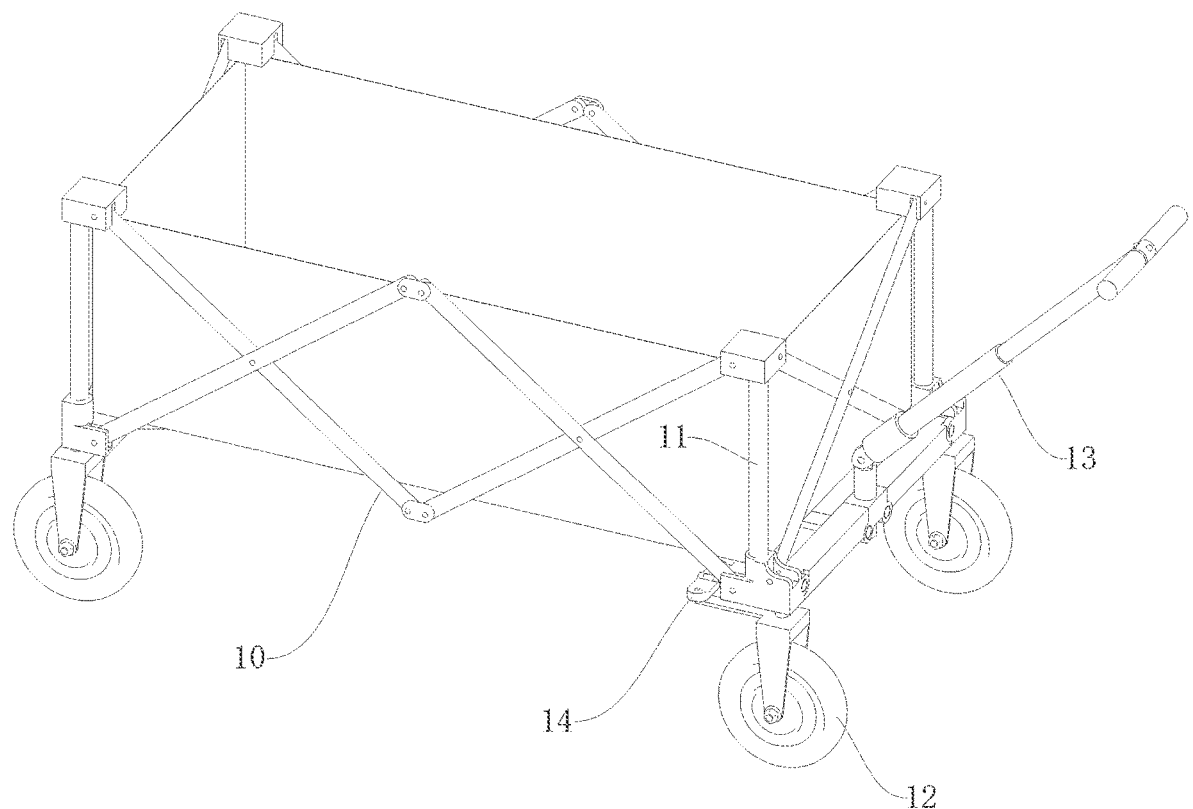
FIG. 5 is a schematic diagram of a steering rod in a bent state according to the present disclosure.

IN THE ACCOMPANYING DRAWINGS 10. foldable frame, 11. connection device, 111. frame supporting seat, 112. limiting slot, 12. steering wheel, 121. wheel steering swing arm, 13. steering rod assembly, 131. steering rod supporting arm, 132. steering rod, 133. steering bearing, 134. pull rod switch sleeve, 14. steering structure, 141. steering guide rod, 142. steering arm, 15. seat plate, 151. seat plate supporting frame, 16. pedal, 17. wheel rotation limiting structure, 171. pin sleeve, and 172. pin.

DETAILED DESCRIPTION OF THE EMBODIMENTS

In order to make the above objective, features and advantages of the present disclosure more apparent and understandable, particular embodiments of the present disclosure will be described in detail below in combination with accompanying drawings. Many specific details are set forth in the following description to facilitate full understanding of the present disclosure. However, the present disclosure can be implemented in many other ways different from those described herein. Those skilled in the art can make similar improvements without departing from the connotation of the present disclosure. Therefore, the present disclosure is not limited by the particular examples disclosed below.

In descriptions of examples of the present disclosure, it should be noted that unless expressly specified otherwise, the terms "connect" and "mount" should be understood in a broad sense. For instance, "connect" can indicate detachable connection or undetachable connection; and can indicate direct connection or indirect connection via an intermediary medium. In addition, "communicate" can indicate direct communication or indirect communication via an intermediary medium. "Fix" refers to mutual connection after which a relative positional relation keeps unchanged. Orientation terms such as "inner", "outer", "top" and "bottom" mentioned in examples of the present disclosure are merely directions with reference to accompanying drawings. Thus, orientation terms are used for better and more clearly describing and understanding examples of the present disclosure, and do not indicate or imply that the device or element referred to must have a particular orientation, be constructed and operate in a particular orientation, and therefore cannot be construed as limiting examples of the present disclosure.

In examples of the present disclosure, the terms "first" and "second" are used for descriptive purposes only, and cannot be construed as indicating or implying relative importance or implicitly indicating the number of technical features indicated. Thus, a feature defined with "first" and "second" can explicitly or implicitly include one or more of the features.

In examples of the present disclosure, the term "and/or" merely describes an association relation between associated objects, and indicates that there can be three relations. For instance, A and/or B can represent A alone, both A and B, and B alone. Moreover, the character "/" herein generally indicates an "or" relation between the associated objects.

Reference in the description to "an example" or "some examples", etc. means that one or more examples of the present disclosure include particular features, structures or characteristics described in combination with the examples. Thus, the phrases "in an example", "in some examples", "in some other examples", etc. appearing in difference parts in the description do not all certainly refer to the same example, but mean "one or more but not all examples", unless specifically emphasized otherwise. The terms "include", "comprise", "have", and their variations mean "including but not limited to" or "comprising but not limited to", unless specifically emphasized otherwise. Therefore, the present disclosure is not limited by particular examples disclosed below.

As shown in FIGS. 1-5, the present disclosure provides a folding and man-riding structure of a foldable cart steering system. The folding and man-riding structure includes a foldable frame 10. Steering wheels 12 are connected to a bottom of the foldable frame 10, and the steering wheels 12 are connected to a steering structure 14 by means of wheel steering swing arms 121. The steering structure 14 is foldable. A steering rod assembly 13 is further connected to the steering structure 14, and the steering rod assembly 13 is configured to control movement of the steering structure 14.

Specifically, the foldable frame 10 is a converged type vehicle body, a converged type means that a middle arches upwards, and front, rear, left and right portions converge towards the middle to be folded. The converged type vehicle body occupies less space after being folded than other types of foldable frames 10. The foldable frame 10 is provided with four connection devices 11, and the four connection devices 11 delimit a rectangle. Each connection device 11 includes a frame supporting seat 111, and the frame supporting seat 111 is configured to be connected to a frame. Steering wheels 12 are arranged below each frame supporting seat 111, and a wheel steering swing arm 121 is arranged at a top of each steering wheel 12. A steering structure 14 is connected between two wheel steering swing arms 121 at the same end, and the steering structure 14 is configured to control rotation of the steering wheels 12. A steering rod assembly 13 is further connected to the steering structure 14, the steering rod assembly 13 can horizontally rotate relative to the foldable frame 10, and the steering rod assembly 13 is configured to control movement of the steering structure 14. When rotating, the steering rod assembly 13 drives the steering structure 14 to swing left and right, and the steering structure 14 drives the steering wheels 12 to rotate left and right, such that rotation of the steering wheels 12 is controlled.

It should be pointed out that since the steering wheels 12 are connected together by means of the steering structure 14, the steering wheels are driven by the steering structure 14 to rotate. Therefore, the steering wheels 12 can be straight-fork universal wheels, which can be more stable than inclined-fork universal wheels in a running process. The straight-fork universal wheels cannot freely rotate, and can rotate only when being subjected to a force in a specific direction, such that use safety is improved. Moreover, under the condition of a heavy load, steering of the straight-fork universal wheels is easier. Steering wheels 12 at front ends of the straight-fork universal wheels can horizontally rotate, but steering wheels 12 at rear ends are fixed and cannot horizontally rotate.

Further, the steering structure 14 includes a steering guide rod 141 and steering arms 142. Several steering arms 142 are arranged, and the several steering arms 142 are rotatably connected end to end in sequence. One end of the steering guide rod 141 is movably connected to the steering arm 142 located at a middle, and the other end of the steering guide rod 141 is connected to the steering rod assembly 13.

Specifically, the steering structure 14 includes a steering guide rod 141 and several steering arms 142. The several steering arms 142 are rotatably connected end to end in sequence such that the several steering arms 142 can mutually rotate and be folded, so as to adapt to folding of the foldable frame 10. One end of the steering guide rod 141 is rotatably connected to the steering arm 142 located in a middle, and the other end of the steering guide rod 141 is fixedly connected to the steering rod assembly 13. When the steering rod assembly 13 rotates, the steering guide rod 141 is driven to swing, the steering guide rod 141 swings to drive the steering arm 142 to move left and right, so as to drive the steering wheel 12 connected to the steering arm 142 to rotate left and right to control steering. Preferably, five steering arms 142 are arranged, two steering arms 142 at two ends are equal in length, and two steering arms 142 connected to the two ends are equal in length, such that the steering arm 142 is in a "π"-like shape.

It should be pointed out that a rotation center of the steering guide rod 141 and a rotation center of the steering wheel 12 are located on the same straight line. Under the condition of the structure, it is not required to provide a sliding groove on the steering guide rod 141. Otherwise, since a movement track of the steering guide rod 141 is cambered and the steering arm 142 moves in a straight line, it is required to provide a sliding groove on the steering guide rod 141, so as to prevent a situation that rotation is unachievable due to a movement conflict.

Further, a distance between the two wheel steering swing arms 121 at a same end is less than or greater than a distance between horizontal rotation axes of the two steering wheels 12 at a same end.

Figure 6:
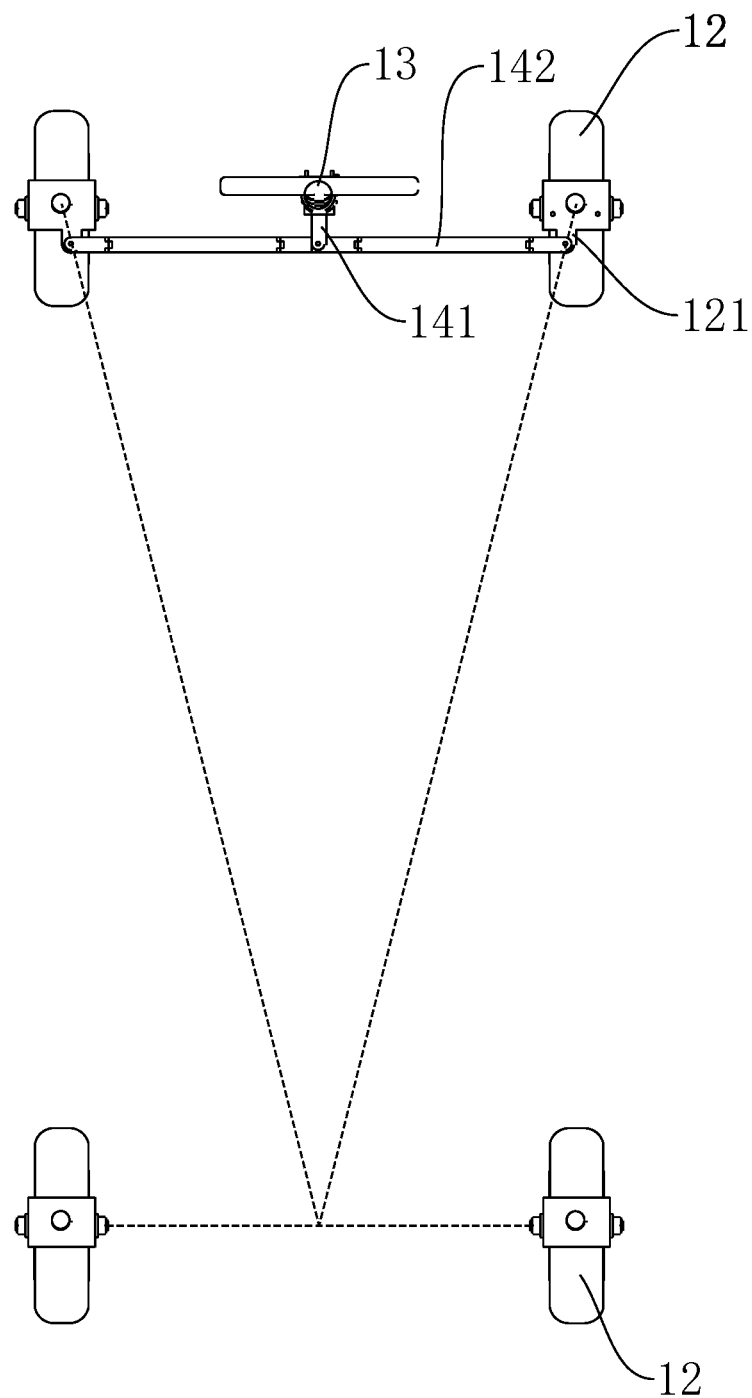
FIG. 6 is a schematic diagram of Ackerman steering according to the present disclosure.

Specifically, as shown in FIG. 6, in order to prevent tire abrasion caused by the same angle of the two steering wheels 12 during cornering, junctions of a steering arm 142 located on a leftmost side and a steering arm 142 located on a rightmost side and corresponding wheel steering swing arms 121 are set on a straight line between a horizontal rotation axis of two steering wheels 12 at a front end and an interval center of two steering wheels 12 at a rear end.

Therefore, during cornering of the two front steering wheels 12, an extension line of a vertical rotation axis of the steering wheel 12 intersects with an extension line of a vertical rotation axis of the steering wheel 12 at the rear end at a point, such that the Ackerman steering principle is achieved, and tire abrasion during cornering is reduced.

It should be pointed out that the distance between the two wheel steering swing arms 121 is less than or greater than the distance between the horizontal rotation axes of the two steering wheels at het same end according to a structure shown in FIG. 6. In this way, a hundred percent Ackerman steering effect can be achieved and is optimal. When the distance between the two wheel steering swing arms 121 is greater than the distance between the horizontal rotation axes of the two steering wheels at the same end, the Ackerman steering effect can still be achieved but is not optimal.

Further, the steering rod assembly 13 includes steering rod supporting arms 131 and a steering rod 132. At least two steering rod supporting arms 131 are arranged. The steering rod 132 is located between the two steering rod supporting arms 131, and a bottom of the steering rod is rotatably connected to the steering rod supporting arms 131. One end of each steering rod supporting arm 131 adjacent to the steering rod 132 is rotatably connected to the steering rod 132 by means of a steering bearing 133, and one end of each steering rod supporting arm 131 away from the steering rod 132 is rotatably connected to the foldable frame 10.

Specifically, the steering rod assembly 13 includes steering rod supporting arms 131. Two steering rod supporting arms 131 are arranged. One end of each steering rod supporting arm 131 is rotatably connected to a frame supporting seat 111 and can vertically rotate relative to the frame supporting seat 111. The two steering rod supporting arms 131 are arranged opposite each other. The steering rod 132 is arranged between the two steering rod supporting arms 131, and the steering rod 132 is connected to the steering rod supporting arms 131 by means of steering bearings 133 such that the steering rod supporting arms 131 can rotate relative to the steering rod 132. When the foldable frame 10 is required to be folded, the steering rod 132 is pulled first to drive the steering rod supporting arm 131 to be switched from a horizontal shape to an inclined shape having a certain angle, and at this time, the foldable frame 10 is folded. When the foldable frame 10 is folded, a distance between two sides will be reduced, and the steering rod supporting arms 131 will be pressed. The steering rod supporting arms 131 are pressed and pushed up to be switched from an inclined shape to a vertical shape, and drives the steering rod 132 to rise. The steering rod 132 rises to synchronously drive the steering structure 14 to arch up by means of the steering guide rod 141, such that the foldable frame 10 is folded. When the foldable frame 10 is unfolded, the two steering rod supporting arms 131 will be pulled by the foldable frame 10 to keep horizontal such that the steering rod 132 can be prevented from moving upon and down in use.

It should be pointed out that bumps (not shown in the figures) horizontally extending are arranged on bottom sides of one ends of the two steering rod supporting arms 131 away from the steering rod 132. When the two steering rod supporting arms 131 are horizontal, the bumps are in contact with a connection seat of the foldable frame 10 and abuts against the connection seat such that the steering rod supporting arms 131 can be prevented from sinking. Moreover, action forces applied to junctions between the steering rod supporting arms 131 and the steering bearings 133 can be shared.

Further, in the example, a seat plate 15 is connected to an upper end of the foldable frame 10 by means of a seat plate supporting frame 151, and the seat plate 15 is detachably arranged on the foldable frame 10. Specifically, the seat plate 1 is detachably arranged on the foldable frame 10, such that when the seat plate 15 is not required, the seat plate 15 can be removed to be prevented from affecting loading of goods or folding of the foldable frame 10.

Further, the steering rod 132 is connected to the steering bearing 133. A folding structure is further arranged on the steering rod 132, and the folding structure is configured to bend the steering rod 132 in a predetermined direction. A pull rod switch sleeve 134 is further slidably arranged on the steering rod 132, and the pull rod switch sleeve 134 is configured to limit folding of the steering rod 132.

Specifically, the steering rod 132 is inserted into the steering bearing 133 and can horizontally rotate relative to the steering bearing 133 to drive the steering guide rod 141 to swing left and right. A folding structure is arranged at the steering rod 132 located above the steering bearing 133. Through the folding structure, the steering rod 132 can vertically rotate relative to the steering bearing 133, such that the steering rod 132 is inclined for convenience of towing. A pull rod switch sleeve 134 movably sleeves the steering rod 132, and the pull rod switch sleeve 134 is configured to limit vertical rotation of the steering rod 132. When the pull rod switch sleeve 134 covers the folding structure, the steering rod 132 is limited by the pull rod switch sleeve 134. That is, the steering rod cannot vertically rotate by means of the folding structure. When the steering rod 132 is required to vertically rotate, the pull rod switch sleeve 134 is only required to be moved to leave a range of the folding structure.

It should be pointed out that a junction between the steering bearing 133 and the steering rod supporting arm 131 is located at the bottom. In this way, the situation that the steering bearing 133 is inclined when the two steering rod supporting arms 131 are folded, so as to drive the steering rod 132 to be inclined can be limited to a certain extent Further, in the example, a pedal 16 is further rotatably connected to one end of the foldable frame 10 provided with the steering rod assembly 13.

Specifically, in order to improve riding comfort of a user, a limiting slot 112 is provided on the frame supporting seat 111, and a pedal 16 is rotatably connected in the limiting slot 112. When in use, the pedal 16 can be turned down to be horizontal such that the user can place feet on the pedal 1 during riding. When not in use, the pedal can be rotatably folded on the foldable frame 10. Two pedals 16 are arranged, and one pedal is arranged on each side.

Further, in the example, two ends of the steering arm 142 located in the middle are horizontally rotatably arranged around a center.

Specifically, two ends of the steering arm 142 located in the middle are set to be capable of horizontally rotating along the middle, such that when the steering rod 132 rotates, the situation that rotation is unsmooth due to a movement conflict can be prevented. Moreover, according to the Ackerman steering principle, by means of the structure, it is ensured that the situation that during steering of the two steering wheels 12, interference occurs on the steering arm 142 and the steering guide rod 141 due to different steering angles of the steering wheels 12 such that the Ackerman steering effect cannot be normally exerted is prevented.

Further, a limiting structure configured to limit a maximum rotation angle of the steering wheel 12 is arranged at one end of the foldable frame 10 connected to the steering wheel 12.

Specifically, in order to prevent the situation that the two steering wheels 12 cannot smoothly return after being driven by the steering arm 142 to rotate to a maximum angle, a limiting structure (not shown in the features) is further arranged on a bottom surface of the frame supporting seat 111 or the steering wheel 12. The limiting structure is configured to cooperate with the steering arm 142 or the wheel steering swing arms 121 to limit continuous rotation after the steering wheel 12 rotates to a certain angle, and the situation that the steering wheel 12 cannot return due to an excessive rotation angle is prevented.

Further, in the example, the two steering wheels connected to the steering structure 14 are respectively provided with wheel rotation limiting structures 17 cooperating with each other 12, and the wheel rotation limiting structures 17 are configured to limit rotation of the steering wheels 12 after the foldable frame 10 is folded.

Figure 7:
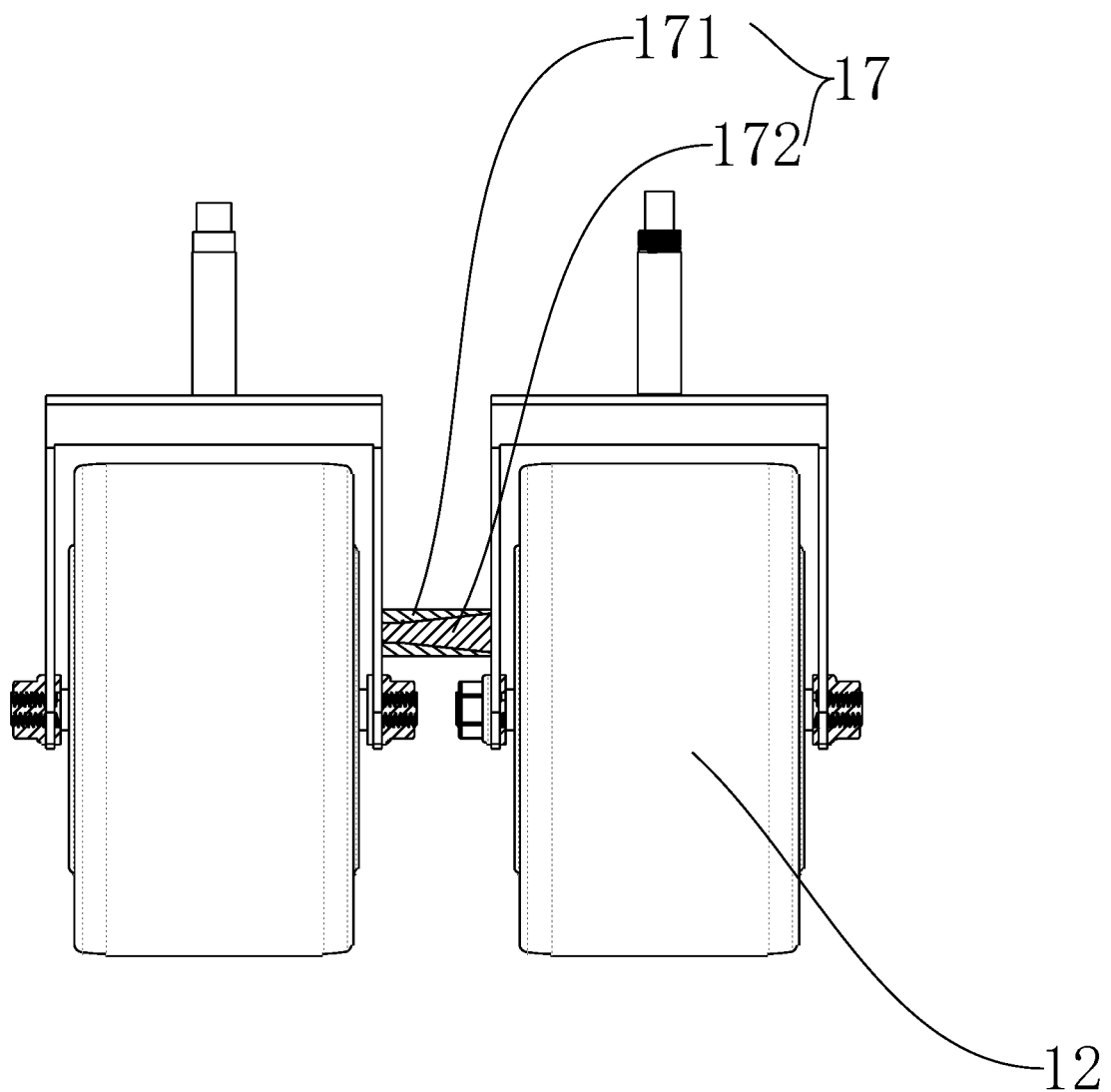
FIG. 7 is a schematic sectional diagram of a wheel rotation limiting structure according to the present disclosure.

Specifically, since the steering wheels 12 are not limited after the foldable vehicle body 10 is folded, if movement occurs, the steering wheels 12 will rotate. In this case, although the steering structure 14 will limit excessive rotation of the steering wheels 12 to a certain extent, complete limitation cannot be achieved. When rotating, the steering wheels 12 drive the steering structure 14 to move. The movement is performed after folding and likely to damage the steering structure 14. In order to avoid the situation, as shown in FIG. 7, the two steering wheels 12 connected to the steering structure 14 are respectively provided with wheel rotation limiting structures 17 cooperating with each other. The wheel rotation limiting structures 17 cooperate with each other after the two steering wheels 12 are close to each other. The wheel rotation limiting structures 17 limit free rotation of the steering wheels 12 after folding, such that the steering structure 14 is prevented from being damaged.

Further, the wheel rotation limiting structure 17 includes a pin sleeve 171 and a pin 172. The pin sleeve 171 is arranged on one steering wheel 12, the pin 172 is arranged on the other steering wheel 12, and the pin sleeve 171 is opposite the pin 172.

Specifically, the pin sleeve 171 is arranged on one steering wheel 12 in a fixation or limited rotation manner, and the pin 172 is arranged on the other steering wheel 12 in a fixation or limited rotation manner. After the two steering wheel 12 are close to each other, the pin 172 will be inserted into the pin sleeve 171, such that rotation of the two steering wheel 12 is limited through cooperation between the pin sleeve 171 and the pin 172. The folded vehicle body is bound by a strap. Under the constraint of the strap, the pin sleeve 171 and the pin 172 on the steering wheel are tightly closed together in an insertion manner, such that separation is prevented. Dragging can be implemented through cooperation between the pin sleeve 171 and the pin 172, such that convenience is improved.

Further, one end of the pin sleeve 171 is flared.

Specifically, in order to improve cooperation smoothness of the pin sleeve 171 and the pin 172, one end of the pin sleeve 171 facing the pin 172 is flared. Through the flared design, convenience when the pin 172 is inserted into the pin sleeve 171 is improved.

In summary, according to the present disclosure, the steering structure 14 composed of a plurality of steering arms 142 is arranged between two steering wheels 12, and the steering structure 14 controls steering of the steering wheels 12. Moreover, the steering structure 14 can be switched between an unfolded state and a folded state so as to adapt to folding of the foldable frame 10, such that control is simple, convenient and practical. By using the structure, the steering wheels 12 can be replaced with straight-fork universal wheels, such that running stability of a vehicle is improved, use safety is high, steering is simpler, a design is reasonable, a structure is simple, and cost is low.

The present disclosure is not only limited to the descriptions in the description and embodiments, such that those skilled in the art can easily achieve additional advantages and modifications. Therefore, the present disclosure is not limited to specific details, representative apparatus and illustrative instances shown and described herein without departing from the spirit and scope of the general concept as defined by the claims and their equivalents.

The invention claimed is:

1. A folding and man-riding structure of a foldable cart steering system, comprising a foldable frame, wherein the foldable frame is a converged type frame, steering wheels are connected to a bottom of the foldable frame, the steering wheels are connected to a steering structure by means of wheel steering swing arms, the steering structure is foldable, a steering rod assembly is further connected to the steering structure, and the steering rod assembly is configured to control movement of the steering structure.

2. The folding and man-riding structure of a foldable cart steering system according to claim 1, wherein a connection device is connected to one side of the foldable frame, the connection device comprises a frame supporting seat, the steering wheels are connected to the frame supporting seat, and one end of the steering rod assembly is connected to the frame supporting seat.

3. The folding and man-riding structure of a foldable cart steering system according to claim 1, wherein the steering structure comprises a steering guide rod and steering arms, several steering arms are arranged, the several steering arms are rotatably connected end to end in sequence, steering arms located at two ends are rotatably connected to corresponding wheel steering swing arms, one end of the steering guide rod is movably connected to the steering arm located at a middle, and the other end of the steering guide rod is connected to the steering rod assembly.

4. The folding and man-riding structure of a foldable cart steering system according to claim 3, wherein a distance between the two wheel steering swing arms at a same end is less than or greater than a distance between horizontal rotation axes of the two steering wheels at a same end.

5. The folding and man-riding structure of a foldable cart steering system according to claim 3, wherein the steering rod assembly comprises steering rod supporting arms and a steering rod, at least two steering rod supporting arms are arranged, the steering rod is located between the two steering rod supporting arms, a bottom of the steering rod is rotatably connected to the steering rod supporting arms, one end of each steering rod supporting arm adjacent to the steering rod is rotatably connected to the steering rod by means of a steering bearing, and one end of each steering rod supporting arm away from the steering rod is rotatably connected to the foldable frame.

6. The folding and man-riding structure of a foldable cart steering system according to claim 1, wherein a seat plate is connected to an upper end of the foldable frame by means of a seat plate supporting frame, and the seat plate is detachably arranged on the foldable frame.

7. The folding and man-riding structure of a foldable cart steering system according to claim 5, wherein the steering rod is connected to the steering bearing, a folding structure is further arranged on the steering rod, the folding structure is configured to bend the steering rod in a predetermined direction, a pull rod switch sleeve is further slidably arranged on the steering rod, and the pull rod switch sleeve is configured to limit folding of the steering rod.

8. The folding and man-riding structure of a foldable cart steering system according to claim 1, wherein a pedal is further rotatably connected to one end of the foldable frame provided with the steering rod assembly.

9. The folding and man-riding structure of a foldable cart steering system according to claim 3, wherein two ends of the steering arm located in the middle are horizontally rotatably arranged around a center.

10. The folding and man-riding structure of a foldable cart steering system according to claim 1, wherein a limiting structure configured to limit a maximum rotation angle of the steering wheel is arranged at one end of the foldable frame connected to the steering wheel.

11. The folding and man-riding structure of a foldable cart steering system according to claim 1, wherein the two steering wheels connected to the steering structure are respectively provided with wheel rotation limiting structures cooperating with each other, and the wheel rotation limiting structures are configured to limit rotation of the steering wheels after the foldable frame is folded.

12. The folding and man-riding structure of a foldable cart steering system according to claim 11, wherein the wheel rotation limiting structure comprises a pin sleeve and a pin, the pin sleeve is arranged on one steering wheel, the pin is arranged on the other steering wheel, and the pin sleeve is opposite the pin.

13. The folding and man-riding structure of a foldable cart steering system according to claim 12, wherein one end of the pin sleeve is flared.

* * * * *